United States Patent
Dor et al.

(10) Patent No.: US 9,113,398 B2
(45) Date of Patent: Aug. 18, 2015

(54) MULTIROLE DEVICE MUXING CHANNEL SCAN WITH CHANNEL SCAN TIME SLICES

(75) Inventors: Keren Dor, Herzeliya (IL); Yoel Boger, Shoham (IL); Artur Zaks, Modiin (IL)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 401 days.

(21) Appl. No.: 13/544,389

(22) Filed: Jul. 9, 2012

(65) Prior Publication Data

US 2014/0010219 A1    Jan. 9, 2014

(51) Int. Cl.
*H04W 4/00* (2009.01)
*H04W 48/16* (2009.01)

(52) U.S. Cl.
CPC ..................... *H04W 48/16* (2013.01)

(58) Field of Classification Search
USPC .................................. 370/336, 328
See application file for complete search history.

(56) References Cited

U.S. PATENT DOCUMENTS

| | | | |
|---|---|---|---|
| 6,304,756 B1 | 10/2001 | Hebeler et al. | |
| 8,036,167 B2 | 10/2011 | Litzinger et al. | |
| 2004/0166897 A1 | 8/2004 | Hamada | |
| 2009/0046673 A1* | 2/2009 | Kaidar | 370/337 |
| 2010/0309893 A1 | 12/2010 | Zhu et al. | |
| 2013/0188621 A1* | 7/2013 | Meylan et al. | 370/336 |

OTHER PUBLICATIONS

"Analysis of TDD Cellular Interference Mitigation Using Busy-Bursts", Peter Omiyi, et al., IEEE Transaction on Wireless Communications, vol. 6, No. 7, Jul. 2007, p. 2722.

* cited by examiner

*Primary Examiner* — Zewdu A Beyen
(74) *Attorney, Agent, or Firm* — Lawrence J. Bassuk; Frank D. Cimino

(57) ABSTRACT

Systems and methods for channel scanning for multirole device are disclosed. One implementation relates to a method for servicing functions by a multirole device. The method comprises dividing a channel scan over a plurality of channels into a plurality of channel scan time periods, and repeatedly time division multiplexing a time period for the servicing of one of a station (STA) function and an access point (AP) function, a time period for the servicing of the other of the STA function and the AP function, and a channel scan time period for each of the plurality of channel scan time periods.

2 Claims, 5 Drawing Sheets

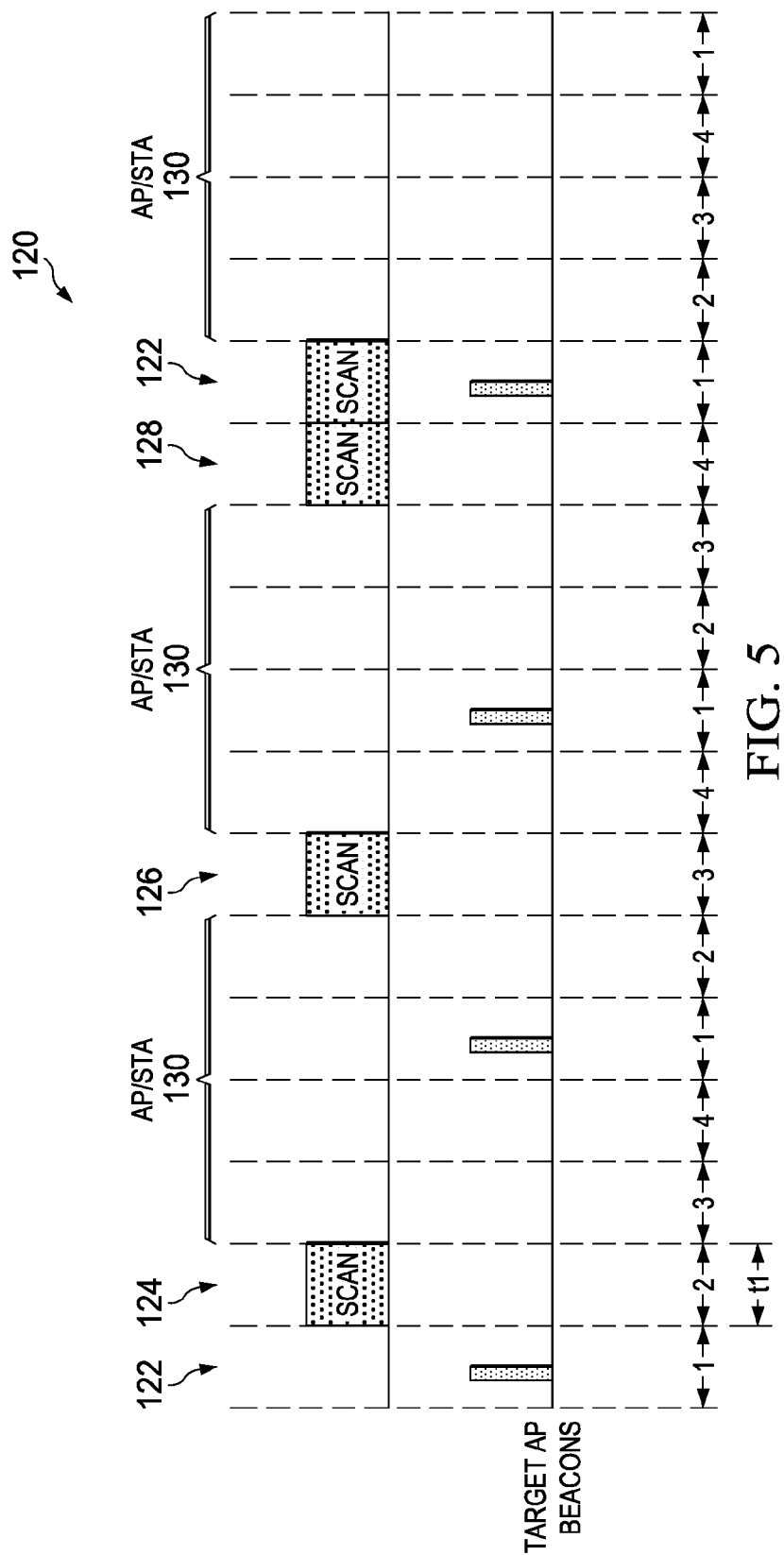

MULTIROLE DEVICE MUXING CHANNEL SCAN WITH CHANNEL SCAN TIME SLICES

TECHNICAL FIELD

The present invention relates generally to electronics, and specifically to systems and methods for channel scanning for multirole device.

BACKGROUND

IEEE 802.11 based wireless and mobile networks also called Wireless Fidelity (WiFi) have experience rapid growth. WiFi is a mechanism that allows an electronic device to exchange data wirelessly over a computer network. A device enabled with Wi-Fi, such as a personal computer, video game console, smartphone, tablet, or digital audio player, can connect to a network resource such as the Internet via a wireless network access point. An access point (or hotspot) has a range of about 20 meters (65 ft) indoors and a greater range outdoors. Hotspot coverage can comprise an area as small as a single room with walls that block radio signals or a large area, as much as many square miles, covered by multiple overlapping access points. A wireless access point (WAP) connects a group of wireless devices to an adjacent wired LAN. An access point resembles a network hub, relaying data between connected wireless devices in addition to a (usually) single connected wired device, most often an ethernet hub or switch, allowing wireless devices to communicate with other wired devices.

The various IEEE 802.11 standards provide for 14 possible channels distributed over a range from 2.402 GHz to 2.483 GHz with each channel being 22 MHz wide. The various IEEE 802.11 standards call for periodic channel scan cycles over at least a majority of the 14 channels to allow for communication handoffs between access points. Scanning can be divided into active and passive scanning. During an active scan, a station (STA) broadcasts a packet requesting that all access points (APs) in those specific channels impart their presence and capability with a probe response. In a passive scan, the STA listens passively for the AP beacons containing all necessary information, such as beacon interval, capability information, supported rate and other parameters associated with the AP.

A multirole device allows a user to operate the device in a multirole mode, where the device can act as both a station and an access point. The emerging desire for increased connectivity usage employing single multirole devices requires support of wireless local area network (WLAN) concurrent multirole operation on two bands/channels by a single Baseband processor. Therefore, the multirole device will switch between providing resource allocation in a station mode and an access point mode. However, when acting in the station mode, the multirole device is required to do a channel scan to search for other access points to allow roaming. The channel scan over at least the majority of available channels can consume a great deal of time, which can result in a lost connection between the multirole device and a connected device being serviced by the multirole device when the multirole device acts as an access point in the access point mode.

SUMMARY

In accordance with an aspect of the present invention, a multirole device is provided that can concurrently function as an access point (AP) and a station (STA) in a wireless network. The device comprises a baseband controller that time division multiplexes between servicing a STA function, an AP function and a channel scan. The baseband controller divides the channel scan into channel scan time slices that divide a channel scan over a plurality of channels into a plurality of channel scan time periods that are each time division multiplexed with time periods for the servicing of the STA function and the AP function. The devise also includes a transceiver for transmitting data received from the baseband controller to other devices of the wireless network, and for receiving and providing data to the baseband controller from other devices of the wireless network.

In accordance with another aspect of the present invention, a method is provided for servicing functions in a multirole device. The method comprises dividing a channel scan over a plurality of channels into a plurality of channel scan time periods, and repeatedly time division multiplexing a time period for the servicing of one of a STA function and an AP function, a time period for the servicing of the other of the STA function and the AP function, and a channel scan time period for each of the plurality of channel scan time periods.

In accordance with yet another aspect of the present invention, a wireless network system is provided that comprises one or more access points (APs) that provides communications of resources from a network to STA devices and one or more STA devices that request resources from the network APs. The wireless network device also comprises at least one multirole device that can concurrently function as an AP and a STA. The at least one device time division multiplexes between servicing a STA function, an AP function and a channel scan, wherein the baseband controller divides the channel scan over a plurality of channels into a plurality of channel scan time periods that are each time division multiplexed with time periods for the servicing of the STA function and the AP function.

BRIEF DESCRIPTION OF THE DRAWINGS

FIG. 5 is a scheduling time line that illustrates a passive scan with full protection in accordance with an aspect of the present invention.

DETAILED DESCRIPTION

Figure 1:
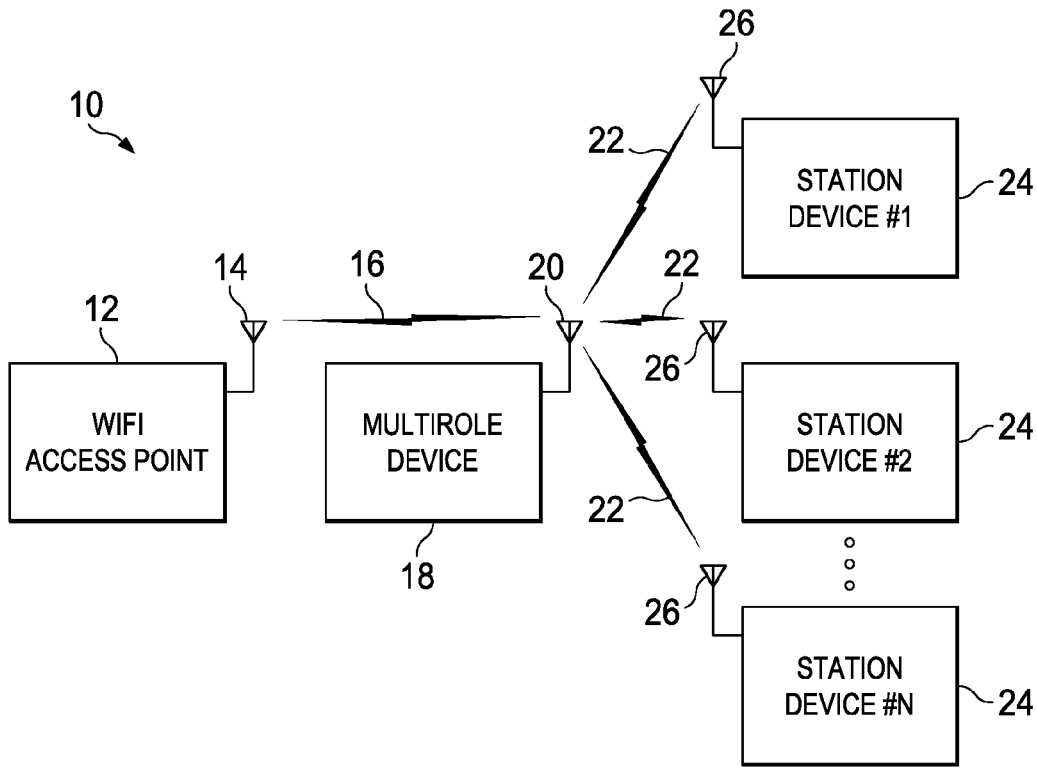
FIG. 1 illustrates an example of a wireless network system in accordance with an aspect of the present invention.

FIG. 1 illustrates an example of a wireless network system 10 in accordance with an aspect of the present invention. The wireless network system 10 can conform to one of the versions of the IEEE 802.11 standards for WiFi networks. The wireless network system 10 includes a WiFi access point (AP) 12 that transmits radio frequency (RF) communications through an antenna 14 over a wireless communication link 16 to a multirole device 18 through an antenna 20. The WiFi AP 12 and one or more other WiFi access points (APs) can be connected to the same or different wired networks (not shown). The multirole device 18 performs periodic channel scans to determine which of a plurality APs to select to connect to and to receive resources from a given WiFi network. An AP can be selected based on one or more parameters (e.g., capacity, signal strength, user selected, etc.) associated with the selected AP. The multirole device 18 functions as a station (STA) device when receiving resources from the selected AP.

Additionally, the multirole device 18 can function as an AP and provide resources to one or more station devices 24 through respective antennae 26 over respective wireless communication links 22. The multirole device 18 can also concurrently function as an STA and an AP. When functioning concurrently as an STA and an AP, the multirole device 18 will time multiplex between servicing the STA function and the AP function over different channels. For example, the multirole device 18 can function as a STA and receive media, gaming or website information from the Internet from a home AP terminal or public WiFi hotspot, and can concurrently function as an AP and stream the received media, gaming or website data to one or more station devices, such as a television, laptop or other station devices. Additionally, the multirole device 18 can function as a STA and receive instant messaging and/or e-mail information from the Internet from a home AP terminal or public WiFi hotspot, and can concurrently function as an AP by streaming media, gaming or website data stored at the multirole device 18 directly to one or more station devices, such as a television, laptop or other station devices.

It is to be appreciated that a STA conforming to IEEE 802.11 is required to perform periodic channel scanning to supporting roaming from one AP to another. Therefore, the multirole device 18 is required to perform a periodic channel scan when functioning as a STA. During the channel scan, the multirole device 18 is dedicated to the STA function and the AP function remains idle. The periodic channel scan can require a substantial amount of time (e.g., up to 120 ms), which may result in a lost connection for the AP function of the multirole device 18 and the one or more wireless stations 24. In accordance with an aspect of the present invention, the channel scan is divided into a plurality of channel scan time slices, such that the channel scan time slices are time division multiplexed with the STA function and the AP function to mitigate lost connects associated with the AP function. As will be further described below, the channel scan can be an active scan or a passive scan. Furthermore, the channel scan time slices can be partially or fully protected by transmitting a clear to send (CTS) to self message by the AP function. This will instruct others connected to the network not to send information to the channel being employed by the AP function of the multirole device 18 for a CTS time period.

Figure 2:
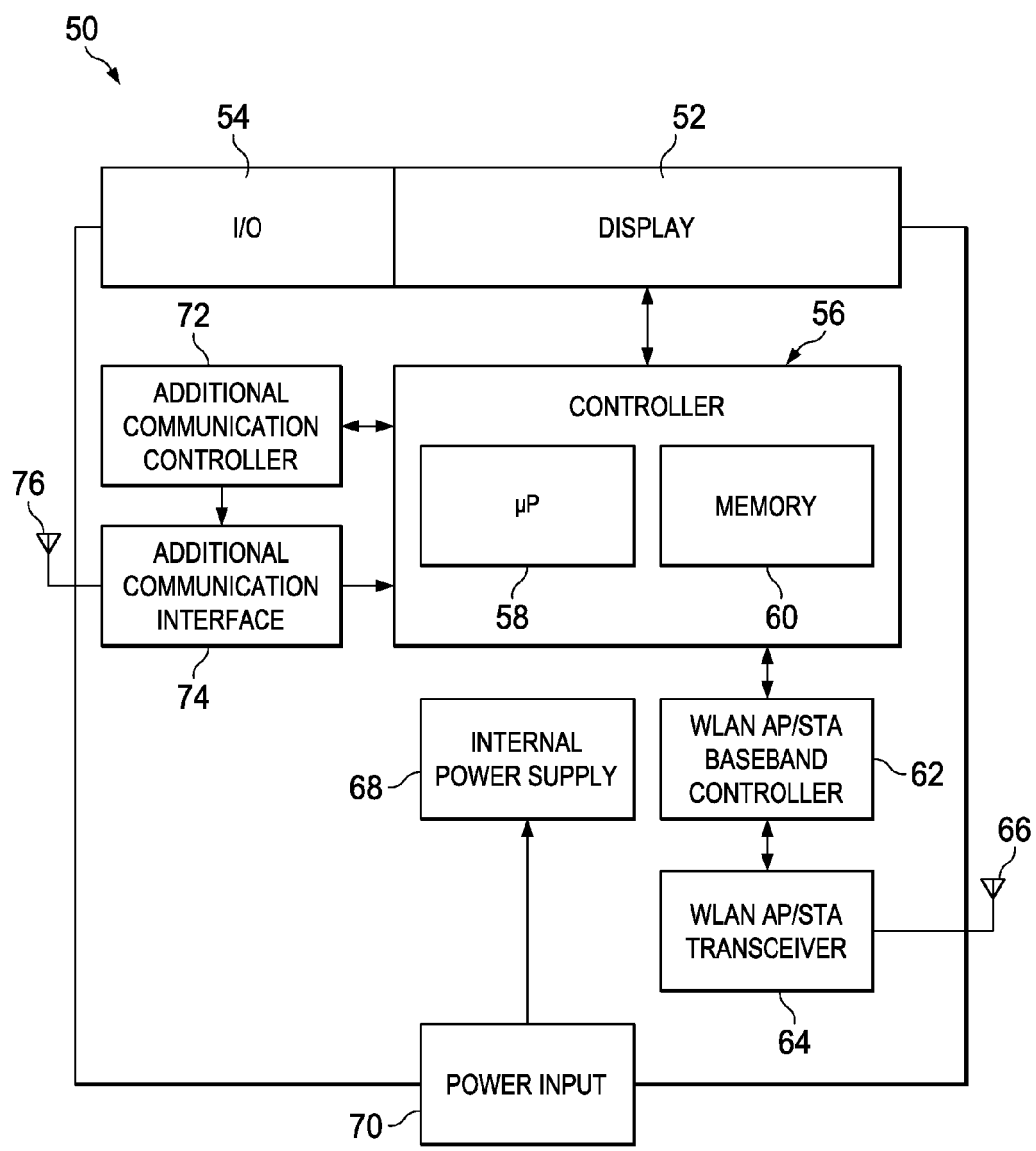
FIG. 2 illustrates a block diagram of an example of a multirole device in accordance with an aspect of the invention.

FIG. 2 illustrates a block diagram of an example of a multirole device 50 in accordance with an aspect of the invention. The multirole device 50 includes a display 52 that can be a touch screen or non-touch screen display. The display 52 could be operative to display media, gaming or website information, and could also be operative to receive touch inputs from a user, such as from a finger or a stylus. The multirole device 52 also includes input/output (I/O) devices 54, such as pushbuttons and LED indicators.

Both the display 52 and the I/O devices 54 are coupled to a controller 56. The controller 56 includes a microcontroller/microprocessor 58 (labeled as μP) and a memory 60. The user can input data into the multirole device 50 via the display 52 and/or the I/O devices 54. The data can be processed by the microcontroller/microprocessor 58 and/or stored in the memory 60. In addition, data can be retrieved from the memory 60 and displayed on the display 52. The multirole device 50 further includes an internal power supply 68. The internal power supply 68 could be, for example, a rechargeable battery, such as a lithium ion battery. The internal power supply 68 is coupled to a power input 70, such that an external power supply (e.g., a DC power adaptor) could be plugged into the power input 70. The external power supply could thus supply power to the multirole device 50 while it is plugged into the power input 70, allowing the multirole device 50 to operate from the external power supply while the internal power supply 68 recharges.

The multirole device 50 includes a WLAN AP/STA baseband controller 62 that operates to manage both the AP and STA functions of the multirole device 50. The WLAN AP/STA baseband controller 62 is coupled to a WLAN AP/STA transceiver 64 that is configured to upconvert data from the baseband controller 62 to be transmitted to other wireless device over an antenna 66, and down convert data received at the antenna 66 from other wireless devices and to be provided to the baseband controller 62. The baseband controller 62 is coupled to the controller 54, such that transmitted and received data can be processed by the microcontroller/microprocessor 58 and/or stored in the memory 60.

The baseband controller 62 manages the functionality associated with transmitting, receiving and time multiplexing data between a STA function of the multirole device 50 and an AP of a wireless network on one channel (e.g., a first channel), and an AP function of the multirole device 50 and one or more STA devices of the wireless network on a different channel (e.g., a second channel). Additionally, the baseband controller 62 handles the functionality of time division multiplexing of the channel scan time slices of the STA function to mitigate lost connections associated with the AP function of the wireless device 50. As previously stated the channel scan can be an active scan or a passive scan, and can be partially or fully protected by transmitting a CTS to self message by the AP function, as will be illustrated and described based on the time division multiplexing time lines, illustrated in FIGS. 3-5.

The multirole device 50 can also include an additional communication controller 72 coupled to an additional communication transceiver 74. The additional communication transceiver 74 is coupled to an antenna 76 for transmitting and receiving communications over other communication networks such as a cellular network (e.g., 3G network, 4G network, etc.). Additional communication controllers and transceivers can be provided for other communication network, such as, for example, IEEE 802.15 (i.e., Bluetooth).

Figure 3:
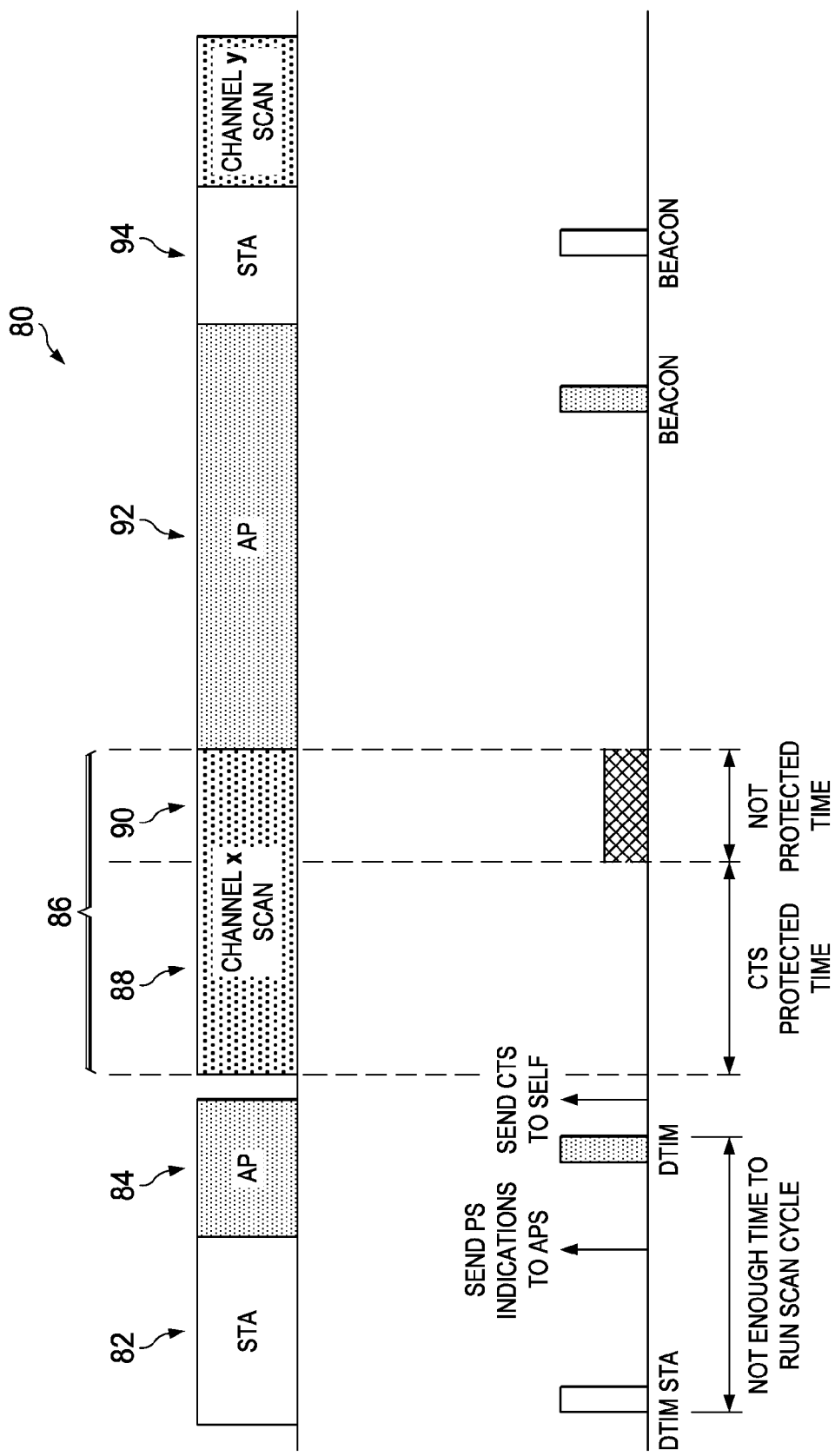
FIG. 3 is a scheduling time line that illustrates an active scan with partial protection in accordance with an aspect of the present invention.

FIG. 3 is a scheduling time line 80 that illustrates an active scan with partial protection in accordance with an aspect of the present invention. An active scan is relatively short (e.g., 60 ms) and utilizes probe requests by the STA function to request messages to discover APs. The active scan is divided into a plurality of channel scan time slices each covering a single channel scan. It is to be appreciated that the number of channels that need to be scanned would be at a maximum of 14, although a less number of channels may be scanned based on the needs of the applications.

The scheduling time line 80 illustrates repeatedly time division multiplexing scheduling between STA function time slices, AP function time slices and a single channel scan time slice over a plurality of different time periods. The STA function time slices and AP function time slices are scheduled in such a way as to allow for AP beacon transmissions together with STA delivery traffic indication message (DTIM) reception. A DTIM is a traffic indication message which informs the STAs about the presence of buffered multicast/broadcast data for a given STA at the AP. After, a DTIM, the AP will send the multicasted broadcast data on the channel following normal channel access rules. A beacon is a periodic frame sent by an AP to indicate to an STA the presence of an AP, provide the STA with synchronization information (synchronized clock), and provide capability information and other parameters associated with the AP.

As illustrated in the scheduling time line 80, the multirole device services the STA function during a first time period 82, which is scheduled to allow for a DTIM from a given access point. At the end of the first time period 82, the STA function sends a power saving (PS) indication to the given access point. The multirole device then switches over to servicing the AP function during a second time period 84, which is scheduled to allow for transmission of a DTIM from the AP function. At the end of the second time period 82, the AP function sends a CTS message to itself. This informs other stations not to transmit data to the AP function for a CTS time period defined by specification associated with the wireless network. This protects the AP function of the multirole device from missing transmissions for the CTS time period. The multirole device then switches over to a channel scan of a first channel (channel x) over a third time period 86 that includes a first time interval 88 and a second time interval 90.

During the channel scan, the STA function transmits probe requests to all APs in that specific channel (channel x) to indicate their existence and capability with a probe response request. The time that the STA function waits to receive all the probe response requests can be set and is typically about 30 ms, but could be greater than 32 milliseconds CTS protection time defined in the IEEE 802.11 specification. The CTS time period is illustrated as the first time interval 88 of the third time period 86. During the second time interval 90 of the third time period 86, the AP function is no longer protected from missing transmission. However, the access point function can receive subsequent retransmissions from the one more wireless station transmission devices connected to the AP function, and therefore, is not likely to miss any important communications.

After the third time period, the multirole device then switches over to servicing the AP function during a fourth time period 92 to complete exchange of any packets not exchanged during the second time period 84, and to allow for transmission of a beacon from the AP function to one or more STAs. The multirole device then switches over to servicing the STA function during a fifth time period 94 to complete exchange of any packets not exchanged during the first time period 82 and to allow for receipt of a beacon from an AP by the STA function. After the fifth time interval, the multirole device then switches over to a channel scan of a second channel (channel y scan). The process then repeats until all of the desired channels are scanned for APs.

Figure 4:
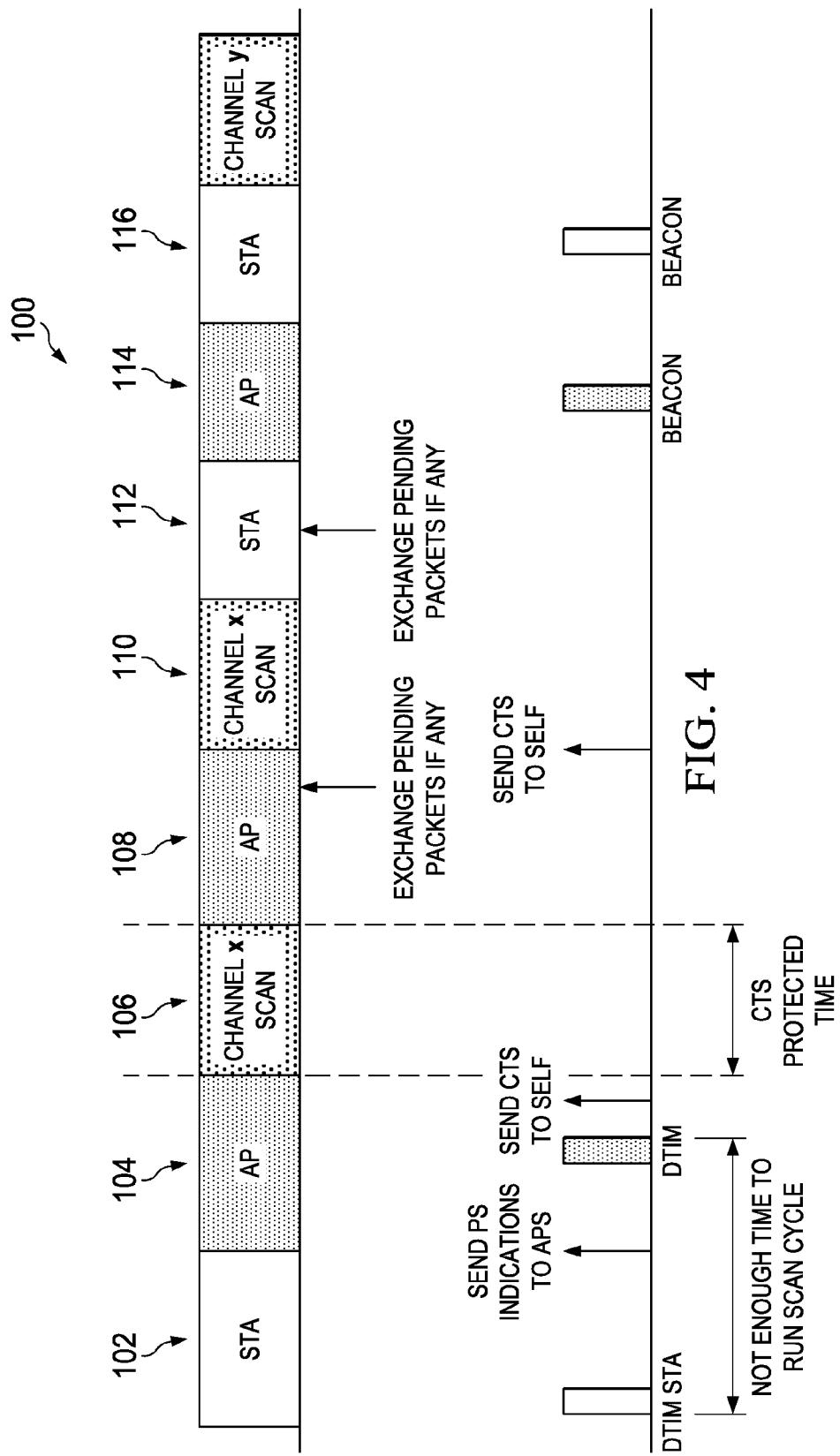
FIG. 4 is a scheduling time line that illustrates an active scan with full protection in accordance with an aspect of the present invention.

FIG. 4 is a scheduling time line 100 that illustrates an active scan with full protection in accordance with an aspect of the present invention. In an active scan with full protection, a channel scan for a given channel is divided into a plurality of time periods, were each time period is equal to or less than a CTS time period. The active scan is divided into a plurality of channel scan time slices that each include a plurality of scan time periods for a single channel scan. Again, the scheduling time line 100 illustrates repeatedly time division multiplexing between STA function time slices, AP function time slices and channel scanning time slices over a plurality of different time periods. The STA function time slices and AP function time slices are scheduled in such a way as to allow for AP beacon transmissions together with STA delivery traffic indication message (DTIM) reception.

As illustrated in the scheduling time line 100, the multirole device services the STA function over a first time period 102, which is scheduled to allow for a DTIM from a given access point. At the end of the first time period 102, the STA function sends a power saving (PS) indication to the given access point. The multirole device then switches over to servicing the AP function during a second time period 104, which is scheduled to allow for transmission of a DTIM from the AP function. At the end of the second time period 104, the AP function sends a CTS message to itself. This informs other stations not to transmit data to the AP function for a CTS time period defined by specification associated with the wireless network. This protects the AP function of the multirole device from missing transmissions for the CTS time period. The multirole device then switches over to a partial channel scan of a first channel (channel×scan) during a third time period 106 that is equal to or less than the CTS time period.

Once the third time period 106 has ended, the AP function is no longer protected from missing transmission. Therefore, the multirole device switches over to the AP function during a fourth time period 108 to complete exchange of any packets not exchanged during the second time period 106. After the fourth time period 108, the multirole device switches over to another partial channel scan of the first channel (channel× scan) over a fifth time period 110 that is equal to or less than the CTS time period. Once the fifth time period 110 has ended, the multirole device switches over to the STA function during a sixth time period 112 to complete exchange of any packets not exchanged during the first time period 102.

After the sixth time period 112, the multirole device then switches over to servicing the AP function during a seventh time period 114 to allow scheduling for transmission of a beacon from the AP function to one or more STAs. The multirole device then switches over to servicing the STA function during an eighth time period 116 to allow for receipt of a beacon from AP's by the STA function. Assuming that the first channel has been fully scanned, the multirole device then switches over to a channel scan of a second channel (channel y scan). The process then repeats until all of the desired channels are scanned for APs.

FIG. 5 is a scheduling time line 120 that illustrates a passive scan with full protection in accordance with an aspect of the present invention. In a passive scan, a STA function is targeted to receive beacons from APs in the proximity and as such needs to run at least one nominal target beacon transmission time (TBTT) period per channel to provide a chance to receive all beacons from all APs on the channel. Therefore, in accordance with an aspect of the present invention, a passive channel scan for a given channel is divided into a plurality of time slices that are scheduled over a plurality of different time periods, were each time period can be equal to or less than a CTS time period. The other STA functions and the AP function can be serviced in between the passive scan time periods. Therefore, the scheduling time line 120 illustrates repeatedly time division multiplexing between STA function time slices, AP function time slices and channel scanning time slices over a plurality of different time periods.

In the example of FIG. 5, the channel scan time slices are divided into four partial scan TBTT time periods for each channel, labeled time period 1-4, to cover a full TBTT time period. In this example, each partial TBTT time period can have a duration of about 30 ms seconds or less, which is less than or equal to a CTS time period of 30 ms. Therefore, a CTS to self just prior to a partial TBTT time period can provide full protection, since the CTS period is greater than or equal to the partial TBTT time period. The passive channel scan for a given channel periodically alternates between each of the four partial scan time periods to listen for an AP beacon on a given channel until a passive channel scan had been performed for each of the partial TBTT time periods. The multirole device time multiplexes between servicing the AP function and STA function during active time periods 130 between each of the partial scan TBTT time periods, similarly to that illustrated in FIGS. 3-4.

In the illustrated example of FIG. 5, a beacon is being transmitted from an AP during a first partial TBTT time period 122, while the STA function is performing a passive channel scan during a second partial TBTT time period 124. Therefore, the passive channel scan will be performed at a third partial TBTT time period 126 and a fourth partial TBTT time period 128, until the beacon is detected once the STA function is performed at the first partial TBTT time period 122. The process then repeats for each channel until all of the desired channels are scanned for APs.

Figure 6:
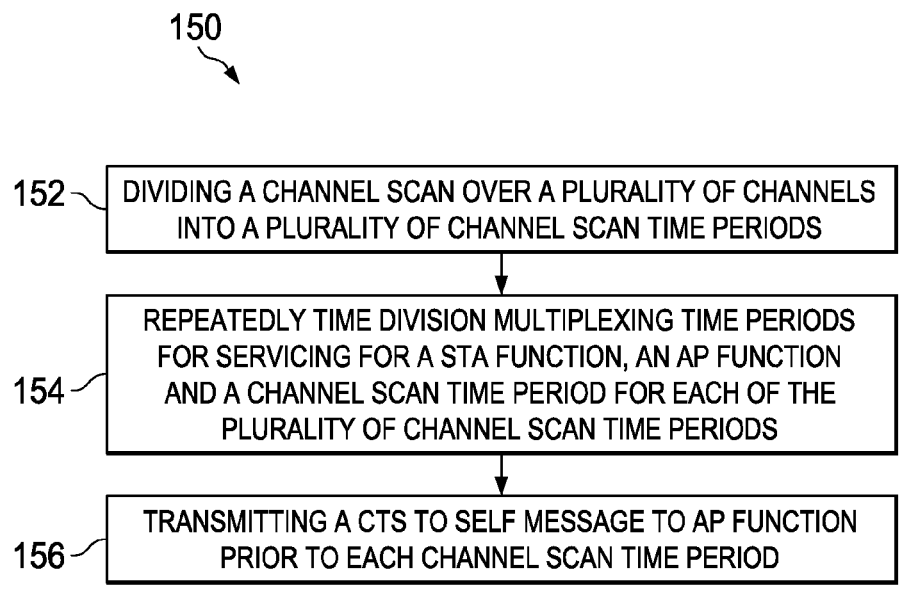
FIG. 6 illustrates an example of a method for servicing functions by a multirole device in accordance with an aspect of the present invention.

In view of the foregoing structural and functional features described above, certain methods will be better appreciated with reference to FIG. 6. It is to be understood and appreciated that the illustrated actions, in other embodiments, may occur in different orders and/or concurrently with other actions. Moreover, not all illustrated features may be required to implement a method.

FIG. 6 illustrates an example of a method 150 for servicing functions by a multirole device. The methodology begins at 152 where a channel scan over a plurality of channels is divided into a plurality of channel scan time periods by a multirole device. At 154, the multirole device repeatedly time division multiplexing a time period for the servicing of one of a STA function and an AP function, a time period for the servicing of the other of the STA function and the AP function, and a channel scan time period for each of the plurality of channel scan time periods. At 156, a CTS to self message to the AP function is transmitted prior to each channel scan time period.

As discussed above with respect to FIG. 3, the channel scan can be an active scan with each single channel being scanned over a single channel scan time period. As discussed above with respect to FIG. 4, the channel scan can be an active scan with each channel scan time period covering a portion of a single channel scan for each of the plurality of channel scan time periods, and wherein each of the channel scan time periods are less than or equal to a CTS time period. Alternatively, as discussed above with respect to FIG. 5, the channel scan can be a passive scan with each channel scan time period having a duration of a partial target beacon transmission time (TBTT) period, such that the multirole device scans a single channel over each of a plurality partial TBTT time periods that cover an entire TBTT time period.

What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A multirole device that can concurrently function as an access point and a station in a wireless network, the multirole device comprising:
   a baseband controller that time division multiplexes between servicing a station function, an access point function and a channel scan, the baseband controller dividing the channel scan into channel scan time slices that divide a channel scan over a plurality of channels into a plurality of channel scan time periods that are each time division multiplexed with time periods for the servicing of the station function and the access point function; and
   a transceiver for transmitting data received from the baseband controller to other devices of the wireless network, and for receiving and providing data to the baseband controller from the other devices of the wireless network,
   wherein the channel scan is a passive scan, and each channel scan time slice has a duration of a partial target beacon transmission time period, wherein the baseband controller scanning a single channel over each of a plurality of partial target beacon transmission time periods that cover an entire target beacon transmission time period, and the baseband controller transmits a clear to send to self message to the access point function prior to each channel scan time period to provide protection of the access point function from further communications from the other devices of the wireless network for a clear to send time period, each of the plurality of partial target beacon transmission time periods is being less than or equal to a clear to send time period.

2. The multirole device of claim 1, including:
   an antenna coupled to the transceiver;
   a controller coupled to the baseband controller;
   a display coupled to the baseband controller;
   at least one additional communication controller; and
   a power supply for providing power to the multirole device.

* * * * *